(12) United States Patent
Moulton

(10) Patent No.: US 6,308,975 B1
(45) Date of Patent: Oct. 30, 2001

(54) BICYCLE AND A REAR WHEEL SUSPENSION THEREFOR

(75) Inventor: Alexander Eric Moulton, Bradford on Avon (GB)

(73) Assignee: Moulton Developments Limited, Bradford On Avon (GB)

( * ) Notice: Subject to any disclaimer, the term of this patent is extended or adjusted under 35 U.S.C. 154(b) by 0 days.

(21) Appl. No.: 09/257,006

(22) Filed: Feb. 25, 1999

(30) Foreign Application Priority Data

Feb. 26, 1998 (GB) .................................................. 9804135

(51) Int. Cl.[7] .................................................. B62K 25/30
(52) U.S. Cl. .................................................. 280/284
(58) Field of Search .................................. 280/281.1, 275, 280/284, 285, 286

(56) References Cited

U.S. PATENT DOCUMENTS

| | | | |
|---|---|---|---|
| 2,452,758 | * 11/1948 | Hutchins | 280/284 |
| 3,151,878 | * 10/1964 | Uncles | 280/284 |
| 3,952,546 | * 4/1976 | Nakano et al. | |
| 4,421,337 | * 12/1983 | Pratt | 280/277 |
| 4,629,352 | * 12/1986 | Nemoto | 403/128 |
| 4,957,279 | * 9/1990 | Thorn | 267/140.5 |
| 5,217,241 | * 6/1993 | Girvin | 280/284 |
| 5,427,208 | * 6/1995 | Motobu et al. | 188/24.13 |
| 5,975,550 | * 11/1999 | Schonfeld | 280/284 |

* cited by examiner

Primary Examiner—Kevin Hurley

(57) ABSTRACT

A pedal bicycle having front and rear wheels is described wherein the rear wheel is supported on an arm structure which is pivotally connected to a main frame of the bicycle, the pivotal connection between the arm structure and the main frame being by a rubber bushed pivot bearing means so constructed and arranged that the rubber is wound elastically in torsion as the arm structure moves pivotally relative to the main frame of the bicycle. Preferably, the rubber bushed pivot bearing means includes a cyclindrical body of rubber bonded between inner and outer cylindrical metal shells with the outer metal shell being held fixed relative to the bicycle main frame and with the inner metal shell being held fixed relative to the arm structure which carries the rear wheel.

6 Claims, 3 Drawing Sheets

BICYCLE AND A REAR WHEEL SUSPENSION THEREFOR

Figure 1:
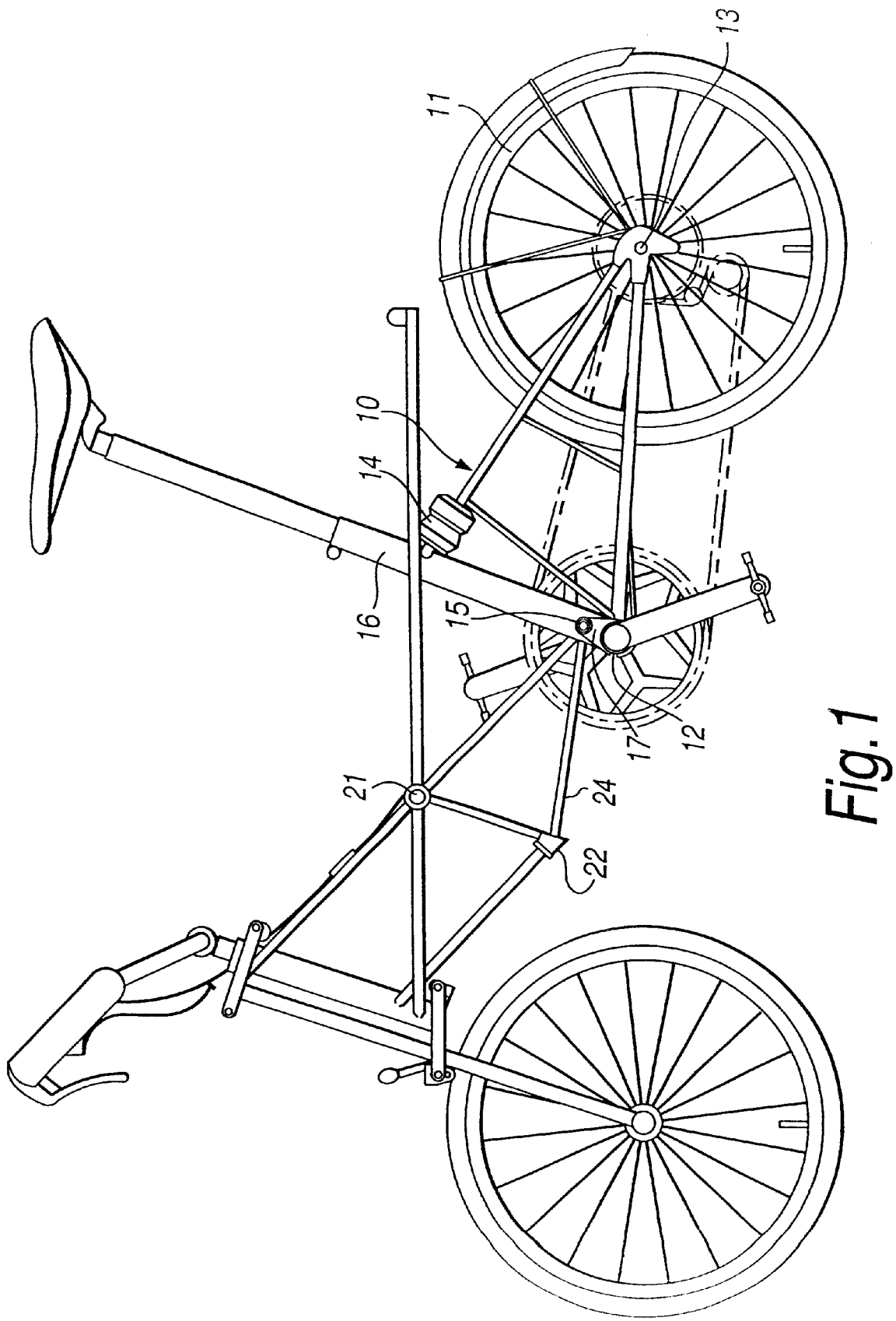

This invention relates to two wheeled cycle vehicles and in particular to a suspension system for the rear wheel of a bicycle, the wheel being a small wheel having an overall diameter of 16 to 20 inches.

This invention has as its object to provide such a system which is of the trailing, swinging arm type; which is afforded resilient suspension means; and which is easily rendered demountable from the remainder of the bicycle so that the machine may be folded so as to occupy a smaller volume or a space rendered more convenient for transport or storage.

Broadly stated this invention provides a pedal bicycle having front and rear wheels wherein the rear wheel is supported on an arm structure which is pivotally connected to a main frame of the bicycle, the pivotal connection between the arm structure and the main frame being by a rubber bushed pivot bearing means so constructed and arranged that the rubber is wound elastically in torsion as the arm structure moves pivotally relative to the main frame of the bicycle.

Preferably, the rubber bushed pivot bearing means includes a cyclindrical body of rubber bonded between inner and outer cylindrical metal shells with the outer metal shell being held fixed relative to the bicycle main frame and with the inner metal shell being held fixed relative to the arm structure which carries the rear wheel.

Advantageously, said arm structure has at a leading end a housing within which is rotatable an axle bridging two pedal cranks, said axle and a spindle of the rear wheel being parallel to one another.

In one preferred embodiment the pivot bearing means including a pivot shaft passing through a housing which is fixed to the bicycle frame and said shaft being disposed parallel to the pedal crank axle, said axle and said pivot shaft being spaced a predetermined distance apart.

The trailing arm structure may comprise a skeletal framework made up of small diameter tubes welded together, having forks extending rearwardly on each side of the rear wheel; and said structure will being shaped to have a generally triangular aspect in side view, with firstly, at a front apex, a transverse tube for housing the pedal crank axle of the cycle; with secondly, a rear apex where the wheel spindle is mounted on fork ends; and with thirdly, an upper apex where there is a spring controlling swinging movement of the forks relative to the cycle frame; such swinging movement being permitted and achieved by a pivot located transversely on the cycle frame at the base of a seat tube thereof and immediately above the transverse tube housing the pedal crank axle with the said tube having upwardly projecting lugs for connection with said transverse pivot.

This framework which constitutes the swinging fork arm therefore has the housing for the pedal crank axle integral with it. As a result the distance between the pedal crank axle and the rear wheel spindle is fixed with these elements being carried by the framework so that they may be demounted, together with the pedals, the chain wheel, the chain, the rear wheel and the gear assembly, all as a single unit, from the remainder of the machine.

Such demounting will be achieved by disconnecting the lugs from the transverse pivot; by disconnecting the spring at the top apex of the framework; and if necessary, disconnecting any cables leading to rear wheel brake systems of gear changing mechanisms associated with the pedal driven rear wheel.

Also by this system now proposed whereby the distance between the pedal crank axle and the rear wheel spindle is fixed, there is avoided torsional wind up of the suspension caused directly by chain tension during pedalling.

The cycle frame will be provided with an upwardly extending saddle supporting structure which is stout and robust and which may be in the form of a stiff tube. At its lower end this structure will mount the transverse pivot which supports swinging of the trailing arm framework. In order to give adequate location to the trailing arm the seat tube will need to give structural support over a lateral span of preferably three inches. The distance between the lugs upstanding from the bottom bracket at the framework front apex will exceed this span.

Said lugs will be connected to opposite ends of a an axial pin which extends through the pivot tube within a rubber to metal bonded bearing bush carried within the pivot tube. This bearing bush includes at least one cylindrical body of rubber bonded and precompressed between inner and outer metal sleeves,the arrangement being such that the rubber is wound in torsional shear during pivotal movements of the trailing arm structure relative to a main frame of the bicycle. Such a rubber bushed bearing will provide very stiff resistance to movements of the trailing arm structure which cause the rubber to be deformed in compression; and less stiff resistance when the rubber is deformed in torsional shear.

In a preferred embodiment the rubber bushed bearing has an axial length(transversel of the bicycle) of 3 inches which is only ½ inch less than the distance between the throws of the cranks of the left and right pedals of the machine. Such a rubber bushed bearing is well adapted to hold the trailing arm structure and the rear wheel carried thereby, correctly in their intended positions while absorbing the heavy loadings imposed by the rider as he operates the pedals of the bicycle.

An upper region of the saddle supporting structure will also receive the reaction forces generated by the spring located at the swinging framework upper apex. This spring may be a rubber spring which is resiliently distorted during the working of the suspension, deforming preferably in both compression and shear. It may have associated with it hydraulic damping means and it may be provided with a gas spring whose internal pressure may be raised or lowered to alter the springing characteristic.

In one embodiment the spring device comprises a frustro conical-rubber bonded unit at the upper apex of the rear triangular forked framework but in which water based fluid is contained. The inner volume is separated by a member in which there is an adjustable orifice. Low pressure air pumped by a bicycle tyre pump can provide sufficient pressure to augment the damping in the rebound mode.

Figure 2:
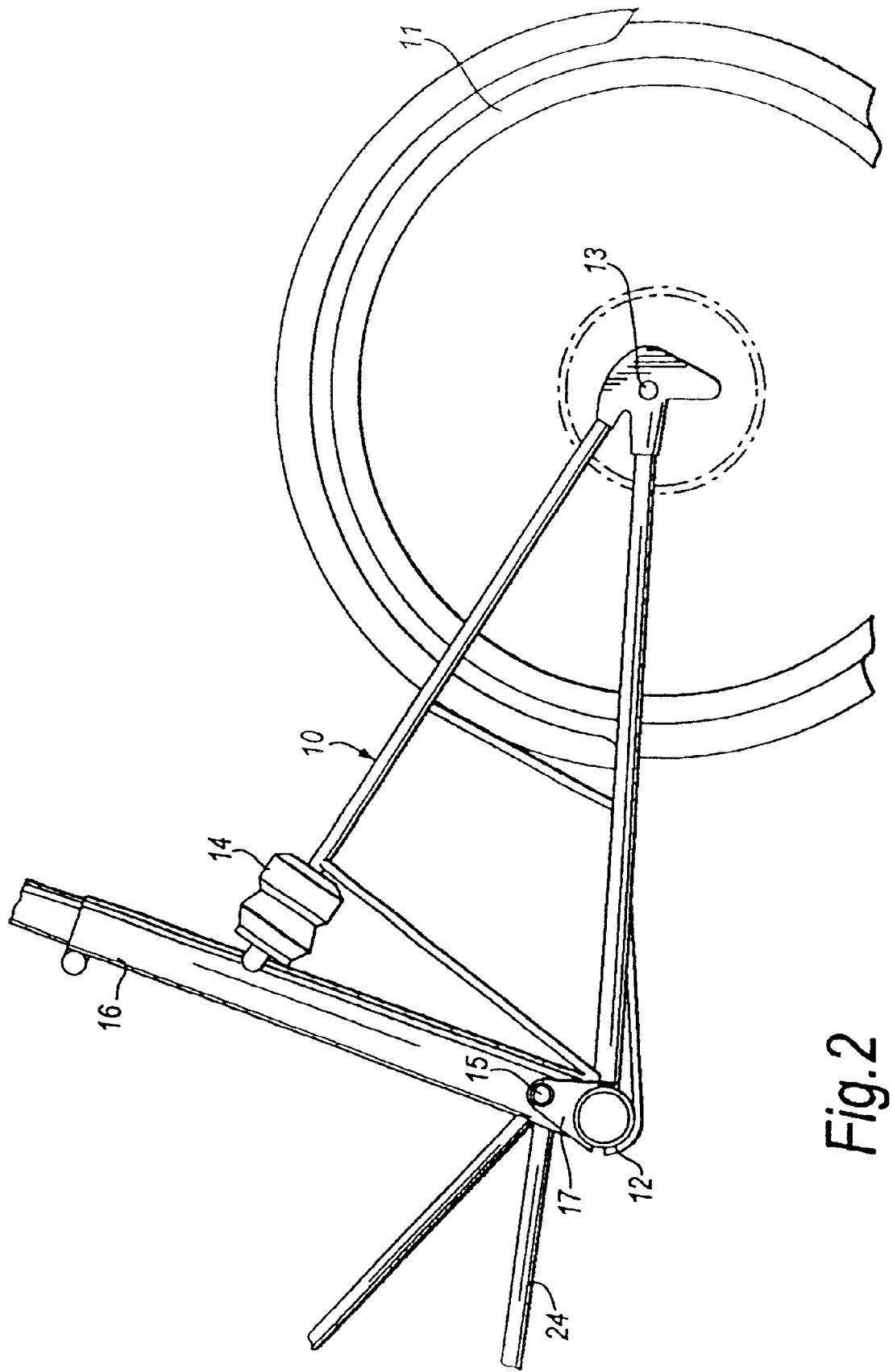
Figure 3A:
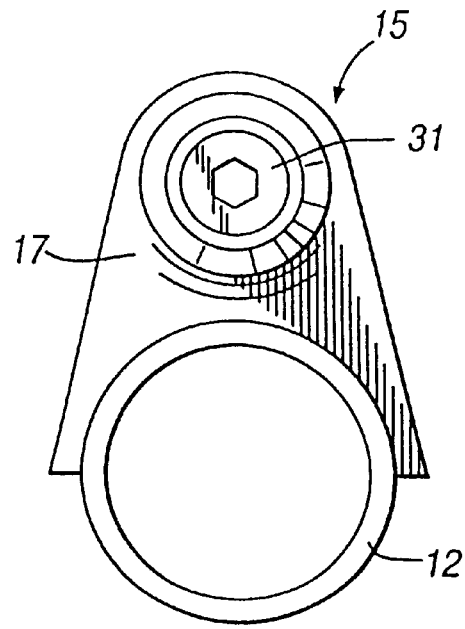
Figure 3B:
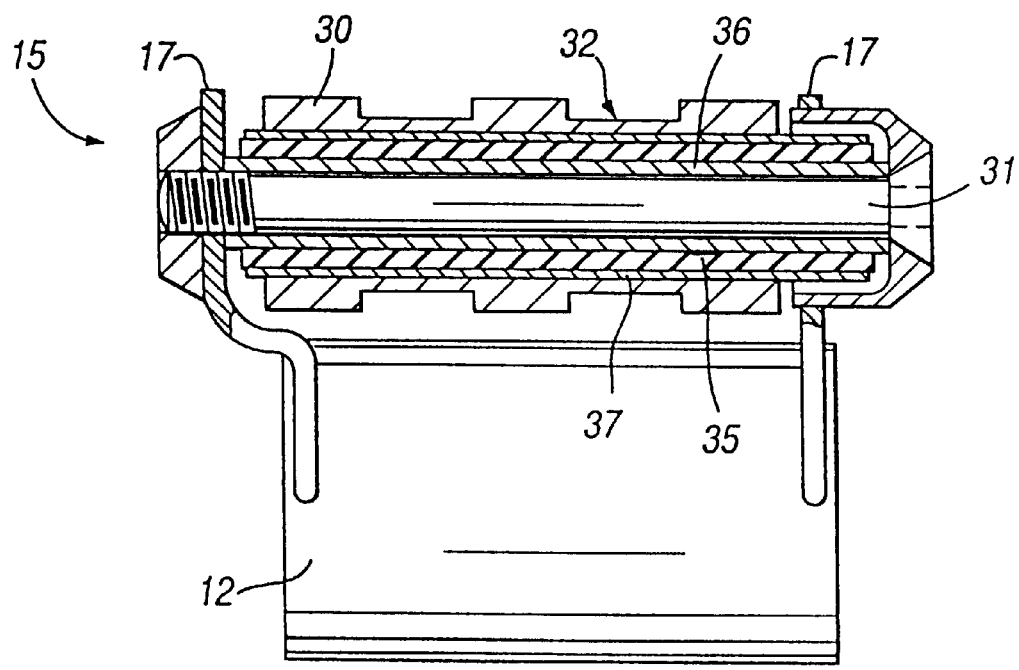

One embodiment of the invention is shown by way of example, in side view, in the accompanying drawings where FIG. 1 is a side view of a bicycle equipped with the new system; while FIG. 2 is a diagrammatic view showing the rear trailing arm components; and FIGS. 3A and 3B are respectively a side view and an end or longitudinal view of the rubber bushed bearing assembly for supporting pivotal movement of the trailing arm structure carrying the rear wheel of the bicycle.

The bicycle shown has a rear wheel suspension system of the trailing, swinging arm type. This includes an arm structure with a skeletal framework generally designated 10, made up of small tubes welded together. This framework 10 has forks extending rearwardly on each side of the rear wheel 11 and has a generally triangular aspect in side view as seen in FIG. 1. At a front apex, there is a transverse tube 12 for housing the pedal crank axle of the cycle; while at a rear apex the wheel spindle 13 is mounted on the fork ends.

At the an upper apex of the framework 10 there is a spring 14 controlling swinging movement of the forks relative to the cycle frame. This spring 14 is a rubber spring which is resiliently deflected to resist upward pivotal movement of the structure 10 as the wheel 11 rises.

Such swinging pivotal movement is achieved by a pivot 15 located transversely on the cycle frame at the base of a saddle supporting structure which in this embodiment is in the form of a seat tube 16. The pivot 15 is disposed immediately above the transverse tube 12 which houses an axle which bridges the left and right hand pedal cranks of the bicycle. As will be described further, the tube 12 has, at its ends, upwardly projecting lugs 17 for connection with said transverse pivot 15.

This tube 12 is integral with the swinging fork arm framework 10, and as a result, the distance between the pedal crank axle and the rear wheel spindle 13 is set and remains constant with these elements being carried by the framework 10 so that they may be demounted, together with the pedals, the chain wheel, the chain, the rear wheel and the gear assembly, all as a single unit, from the remainder of the machine.

Such demounting will be achieved by disconnecting the lugs 17 from the transverse pivot 15; by disconnecting the spring 14 at the top apex of the framework 10; and if necessary, disconnecting any cables leading to rear wheel brake systems of gear changing mechanisms associated with the pedal driven rear wheel 11.

The transverse pivot generally designated 15 will be further described with reference to FIGS. 3A and 3B, which are enlarged views. The main frame of the bicycle will be provided with a stout saddle supporting structure, which in this example is a robust seat tube 16, which will mount at its lower end, a transverse tube 30 which houses the transverse pivot 15 which supports via the lugs 17, pivotal swinging movements of the trailing swinging framework 10. In order to give adequate location to the trailing arm, the transverse pivot 15 will need to have structural support afforded by the transverse tube 30, over a lateral span of say two inches. The distance between the lugs 17 upstanding from the bottom bracket 12 at the framework front apex will exceed this span.

Said lugs will be connected to opposite ends of an axial pin 31 which extends through the pivot tube within a rubber to metal bonded bearing bush 32 carried within the pivot housing tube 30. This bearing bush includes at least one cylindrical body 35 of rubber bonded and precompressed between inner and outer metal sleeves 36 and 37. The inner sleeve 36 is clamped fast with the pin 31 and the lugs 17, while the outer sleeve 37 is fixed to the housing tube 30, for example by being keyed thereto. The arrangement achieved is such that the rubber body 35 is wound in torsional shear during pivotal movements of the lugs 17 which are fixed to the trailing arm structure 10 relative to the housing tube 30 which is fixed to the set tube 16 which is part of the main frame of the bicycle Such a rubber bushed bearing pivot 15 will provide very stiff resistance to movements of the trailing arm structure which cause the rubber to be deformed in compression; and less stiff resistance when the rubber is deformed in torsional shear.

In a preferred embodiment the rubber bushed bearing has an axial length (transversely of the bicycle) of 3 inches which is only ½ inch less than the distance between the throws of the cranks of the left and right pedals of the machine. Such a rubber bushed bearing is well adapted to hold the trailing arm structure and the rear wheel carried thereby, correctly in their intended positions while absorbing the heavy loadings imposed by the rider as he operates the pedals of the bicycle.

The main frame of the cycle illustrated is one which can readily be separable into front and rear sections, separation being effected by means of a king pin at the central node 21 and a hook at the centre junction 22 of the bottom rail. However the light tubes making up the frame can be employed to augment the structural strength required at the location of the transverse pivot 15 for the rear forked framework. Advantageously therefore, a transverse tube 30 for housing the pivot 15 will not only be secured transversely at the base of the seat tube 16 but also laterally protruding portions of this tube 30 to each side, will be connected to some of the light tubing employed to make up the bottom rail 24 the main frame.

The seat tube 16 towards an upper region, will also receive the reaction forces generated by the spring 14 located at the swinging framework upper apex. This spring 14 may be a rubber spring which is resiliently distorted during the working of the suspension, deforming preferably in both compression and shear. It may have associated with it hydraulic damping means and it may be provided with a gas spring whose internal pressure may be raised or lowered to alter the springing characteristic.

What is claimed is:

1. A pedal bicycle having front and rear wheels wherein the rear wheel is supported on an arm structure which is pivotally connected to a main frame of the bicycle, the pivotal connection between the arm structure and the main frame being by a rubber bushed pivot bearing means having a cylindrical body of rubber bonded between inner and outer cylindrical metal shells with the outer metal shell being held fixed relative to the bicycle main frame and with the inner metal shell being held fixed relative to the arm structure which carries the rear wheel, said rubber bushed pivot bearing means so constructed and arranged that the rubber is wound elastically in torsion as the arm structure moves pivotally relative to the main frame of the bicycle, said arm structure having at a leading end a housing within which is rotatable an axle bridging two pedal cranks, said axle and a spindle of the rear wheel being parallel to one another.

2. A pedal bicycle according to claim 1 and wherein said pivot bearing means including a pivot shaft passing through a housing which is fixed to the bicycle frame and said shaft being disposed parallel to the pedal crank axle, said axle and said pivot shaft being spaced a predetermined distance apart.

3. A bicycle having front and rear wheels wherein the rear wheel is supported on an arm structure which is pivotally connected to a main frame of the bicycle, the pivotal connection between the arm structure and the main frame being by a rubber bushed pivot bearing means so constructed and arranged that the rubber is wound elastically in torsion as the arm structure moves pivotally relative to the main frame of the bicycle, said bicycle further including a handlebar, a saddle and a pedal crank assembly, the main frame supporting and maintaining in predetermined relationship said handlebar, said saddle, said pedal crank assembly, said pedal crank assembly including an axle bridging two pedal cranks, said axle being rotatable within a tubular housing which extends transversely of the bicycle and which is connected pivotally to the frame by a pair of lugs which extend from it to the pivotal connection.

4. A bicycle according to claim 3 wherein the rear wheel which is driven by rotating two pedals and the axle bridging the two pedals are both mounted on the arm structure which is connected to the main frame by non-metallic resilient rubber bearing arranged to afford pivotal movement of said arm structure relative to the main frame about an axis parallel to and adjacent the axis of the crank bridging the two pedals.

5. A pedal bicycle having front and rear wheels wherein the rear wheel is supported on an arm structure which is pivotally connected to a main frame of the bicycle, the pivotal connection between the arm structure and the main frame being by a rubber bushed pivot bearing means so constructed and arranged that the rubber is wound elastically in torsion as the arm structure moves pivotally relative to the main frame of the bicycle, wherein the trailing arm structure supporting the rear wheel comprises a skeletal framework made up of small tubes welded together, having forks extending rearwardly on each side of the rear wheel;

and wherein the arm structure has a generally triangular aspect in side view, with at a front apex, a transverse tube for housing an axle bridging two pedal cranks of the cycle;

and wherein the arm structure has a rear apex where a spindle of the rear wheel is mounted on fork ends of the structure;

and with the arm structure having an upper apex where there is a spring controlling swinging movement of the arm structure relative to the cycle frame, such swinging movement being permitted and achieved by a pivot located transversely on the cycle frame at the base of a seat tube thereof and immediately above the transverse tube housing the pedal crank axle with the said transverse housing tube having upwardly projecting lugs for connection with said transverse pivot.

6. The bicycle of claim 5, and wherein the framework together with the pedals, the chain wheel, the chain, the rear wheel and the gear assembly, all as a single unit, is demountable from the remainder of the machine by disconnecting said lugs from the seat tube at the location of said transverse pivot.

* * * * *